A. CAMARDA.
AUTOMOBILE FENDER AND BUFFER.
APPLICATION FILED MAR. 5, 1909.
947,674. Patented Jan. 25, 1910.
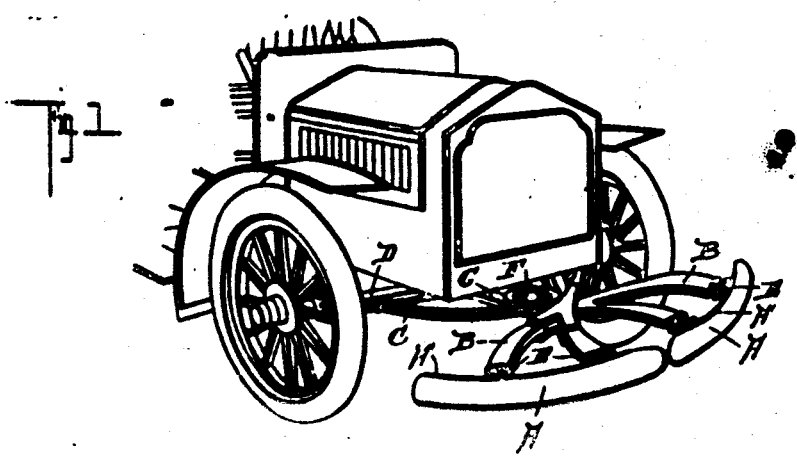
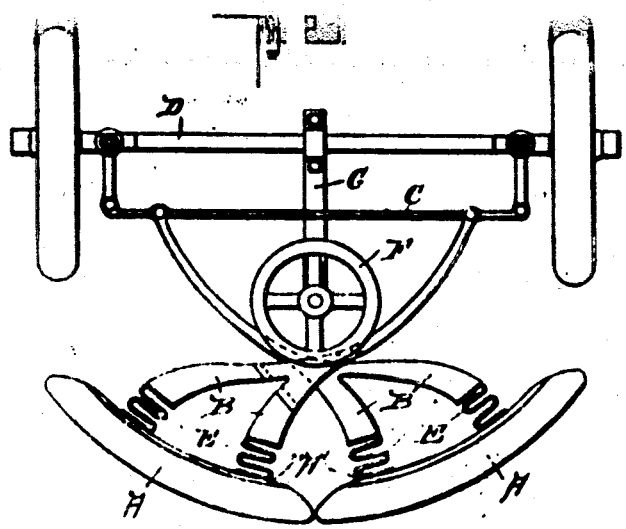
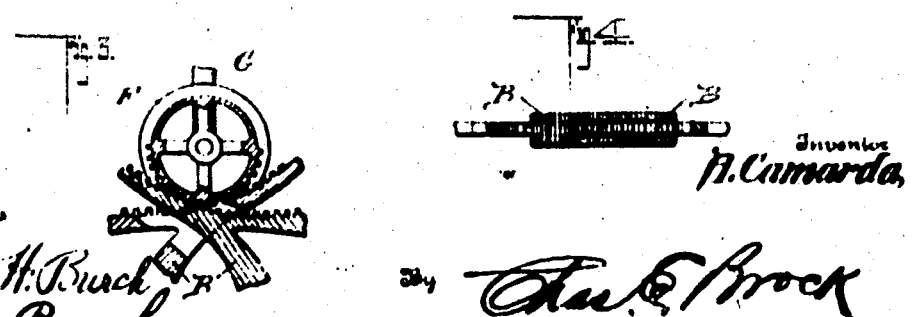
Inventor
A. Camarda

UNITED STATES PATENT OFFICE.

ANTONIO CAMARDA, OF NEW YORK, N. Y.

AUTOMOBILE FENDER AND BUFFER.

947,674.

Specification of Letters Patent.  Patented Jan. 25, 1910.

Application filed March 8, 1909. Serial No. 462,057.

*To all whom it may concern:*

Be it known that I, ANTONIO CAMARDA, a subject of the King of Italy, at present residing in New York city, in the State of New York, have invented a new and useful Improvement in Automobile Fenders and Buffers, of which the following is a specification.

This invention relates generally to an automobile fender or buffer, and more particularly to one which not only protects the forward end of the automobile and also the object struck, but which will operate when an object is struck to divert or turn to one side the automobile, thereby shifting the impact, and greatly avoiding the shock which would otherwise come upon both the fender or buffer, and the object struck, if this diverting or shifting operation did not take place.

Another object of the invention is to provide an automobile fender or buffer connected with the steering rod of an automobile, whereby the front wheels will be turned at an angle proportionate to the shock or pressure received upon the fender or buffer, whereby the automobile as a whole is turned away from the object coming in contact with the fender or buffer, and a still further object is to provide a device which can be quickly and easily connected with any construction of automobile.

With these objects in view, my invention consists essentially in making a fender or buffer in two sections, and connecting each section with one end of the steering rod connecting the knuckles, so that when one section of the fender is struck, the force will be communicated to the said steering rod for the purpose of turning the wheels in such direction as to slant, shift or divert the automobile off in an oblique direction.

The invention consists also in certain details of construction, and novelties of combination all of which will be fully described hereinafter and pointed out in the claims.

In the drawing forming a part of this specification:—Figure 1 is a perspective view showing the practical application of my invention. Fig. 2 is a plan view, and Figs. 3 and 4 show details of construction in section.

In carrying out my invention I employ a fender or buffer which is preferably made in two sections A, each section being curved as shown so as to protect the forward end of the automobile. Each section A is made any desired shape and is preferably built up in the form of a cushion upon any suitable framework having a rigid back A'.

It will be noted that the two sections of the fender meet at their inner ends so as to avoid any object such as a tree or post passing between them, and coming in contact with the forward end of the automobile or the fender mechanism connected therewith.

The cushion sections A are supported by means of the curved bars or rods B, the rear ends of said bars being connected to the steering bar C at or near the ends of said bar, said steering bar being arranged in advance of the axle D, and the knuckle arms will therefore project forwardly, and connect to the ends of the steering bar. These curved bars or rods B cross each other as shown, so that the rod which connects with the left end of the steering bar supports the right section of the cushion fender, and the right hand bar or rod supports the left hand section of the cushion fender, and it will be noted that the forward ends of these bars are bifurcated so that there may be two points of connection between the rods or bars and the cushion sections, and in order to take up the direct shock or blow from the rods or bars B I preferably interpose springs E which are connected to the forward ends of the rods or bars B, and to the rear faces of the sections A, said springs being serpentine in form, and constituting a spring connection between the fender or buffer, and the curved rods or bars which in turn are connected to the ends of the steering bar. As before stated, these curved rods cross each other, and in practice I preferably make one rod or bar wider than the other, and slot it centrally and pass the other rod or bar through this slot, as clearly shown. In order to support the rods or bars in their proper positions and also equalize their movements I employ a toothed wheel or drum F, which is mounted upon an angular bracket G rigidly connected to the front axle, and extending forwardly, the toothed wheel or drum being mounted upon the vertical end or journal portion of said bracket, as shown. The faces of the rods or bars which contact with the wheel or drum are also toothed, so as to engage the teeth upon the wheel or drum, said wheel or drum turning freely upon its journal, whenever the rods are caused to move by either one of the cushion sections being forced inwardly by coming in contact with any object. The wheel or drum is also preferably provided with top and bottom flanges between which the curved rods work as they contact with the teeth. The bracket which supports the toothed wheel can be made any shape desired in order to accommodate various heights of axles, and also various makes of automobiles.

In operation if an object, such as a tree, post or person should come into contact with one of the fender sections, that section will be pushed inwardly, and this inward movement will be communicated along the curved rods to the steering bar, and said steering bar being connected with the wheels will immediately shift said wheels to an oblique position, and the forward motion of the automobile instead of being in a direct line, will be off to one side, so that the object will not receive a direct blow or impact, but will only receive a slanting blow.

By means of a fender or buffer constructed and arranged as described, it will be almost impossible for the automobile or an object to receive a severe and direct blow or shock, and a fender of this kind will be particularly serviceable upon racing and high speed machines. The employment of the toothed wheel maintains the curved bars in their relative positions, and also equalizes their actions.

It will thus be seen that I provide a simple, inexpensive and durable automobile fender capable of carrying out all of the objects hereinbefore referred to.

Having thus fully described my invention, what I claim as new and desire to secure by Letters Patent is:—

1. The combination with a steering bar, of a two-part fender, means for connecting said parts of the fender with the opposite ends of said steering bar, whereby when one part of the fender is struck, the steering bar will be shifted, for the purpose specified.

2. A fender comprising two cushioned sections, curved bars connected to said sections, and operatively connected with the steering bar of an automobile, whereby when either of said sections is struck the steering bar will be shifted, for the purpose specified.

3. In a fender of the kind described, the combination with the cushion sections, curved rods or bars connected therewith and crossing each other, the steering bar to which the inner ends of said curved rods or bars are connected, and a wheel or drum interposed at the juncture of the said curved rods, for the purpose set forth.

4. In a fender of the kind described, the combination with cushion sections, curved rods connected therewith, springs interposed between the curved rods and cushion sections, and a wheel or drum interposed between the curved rods at their juncture, as set forth.

5. In a fender, of the kind described, the combination with a toothed wheel or drum, suitably mounted, of curved rods or bars crossing each other, and connected at their inner ends to the opposite ends of a steering bar, said curved rods being toothed, springs carried at the forward ends of said rods, and the cushion fender sections attached to said springs, all of said parts being constructed, arranged and adapted to operate substantially as described.

ANTONIO CAMARDA.

Witnesses:
JOHN FURANO,
CHARLIE BOINZA.